(12) United States Patent
Burnham et al.

(10) Patent No.: US 7,689,079 B2
(45) Date of Patent: Mar. 30, 2010

(54) OPTICAL FIBER INTERCONNECTION DEVICES AND SYSTEMS USING SAME

(75) Inventors: William R. Burnham, Hickory, NC (US); Robert W. Dennis, Hickory, NC (US); Alan W. Ugolini, Hickory, NC (US); Terry L. Cooke, Hickory, NC (US); Tory A. Klavuhn, Newton, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 12/077,647

(22) Filed: Mar. 20, 2008

(65) Prior Publication Data

US 2009/0180737 A1 Jul. 16, 2009

Related U.S. Application Data

(60) Provisional application No. 61/010,807, filed on Jan. 11, 2008.

(51) Int. Cl.
*G02B 6/26* (2006.01)
*G02B 6/42* (2006.01)

(52) U.S. Cl. .............................. 385/51; 385/15; 385/24; 385/31; 385/39; 385/50; 385/59; 385/70; 385/71; 385/75; 398/55; 398/56; 398/57; 398/140; 398/141; 398/165

(58) Field of Classification Search .................... 385/24, 385/51; 398/56
See application file for complete search history.

(56) References Cited

U.S. PATENT DOCUMENTS 4,611,887 A 9/1986 Glover et al. ............ 350/96.21

4,699,460 A 10/1987 Szentesi ................... 350/96.21

(Continued)

FOREIGN PATENT DOCUMENTS

EP 1065544 1/2001

(Continued)

OTHER PUBLICATIONS

Patent Cooperation Treaty, International Search Report for International Application No. PCT/US2009/000119, Mar. 30, 2009, 2 pages.

(Continued)

*Primary Examiner*—Frank G Font
*Assistant Examiner*—Ryan Lepisto
(74) *Attorney, Agent, or Firm*—John H. Vynalek (57) ABSTRACT

Optical fiber interconnection devices, which can take the form of a module, are disclosed that include an array of optical fibers and multi-fiber optical-fiber connectors, for example, two twelve-port connectors or multiples thereof, and three eight-port connectors or multiples thereof. The array of optical fibers is color-coded and is configured to optically interconnect the ports of the two twelve-port connectors to the three eight-port connectors in a manner that preserves transmit and receive polarization. In one embodiment, the interconnection devices provide optical interconnections between twelve-fiber optical connector configurations to eight-fiber optical connector configurations, such as from twelve-fiber line cards to eight-fiber line cards, without having to make structural changes to cabling infrastructure. In one aspect, the optical fiber interconnection devices provide a migration path from duplex optics to parallel optics.

32 Claims, 7 Drawing Sheets

U.S. PATENT DOCUMENTS

| | | | | |
|---|---|---|---|---|
| 5,155,785 | A * | 10/1992 | Holland et al. | 385/89 |
| 5,166,995 | A | 11/1992 | Briggs et al. | 385/58 |
| 5,204,925 | A * | 4/1993 | Bonanni et al. | 385/89 |
| 5,394,503 | A * | 2/1995 | Dietz et al. | 385/135 |
| 6,185,348 | B1 | 2/2001 | Shahid | 385/49 |
| 6,219,479 | B1 | 4/2001 | Madden et al. | 385/46 |
| 6,222,976 | B1 * | 4/2001 | Shahid | 385/134 |
| 6,229,933 | B1 | 5/2001 | Curzio et al. | 385/17 |
| 6,351,590 | B1 * | 2/2002 | Shahid | 385/134 |
| 6,402,393 | B1 | 6/2002 | Grimes et al. | 385/89 |
| 6,464,404 | B1 * | 10/2002 | Robinson et al. | 385/54 |
| 6,498,882 | B1 * | 12/2002 | Buckelew et al. | 385/114 |
| 6,549,710 | B2 * | 4/2003 | Simmons et al. | 385/121 |
| 6,554,483 | B1 * | 4/2003 | Sun et al. | 385/59 |
| 6,556,754 | B2 * | 4/2003 | Simmons et al. | 385/121 |
| 6,567,603 | B1 * | 5/2003 | Sukegawa et al. | 385/137 |
| 6,585,524 | B2 * | 7/2003 | Robinson et al. | 439/54 |
| 6,587,618 | B2 | 7/2003 | Raguin et al. | 385/33 |
| 6,597,845 | B2 * | 7/2003 | Sun et al. | 385/114 |
| 6,655,848 | B2 * | 12/2003 | Simmons et al. | 385/56 |
| 6,694,083 | B2 | 2/2004 | Paradiso et al. | 385/135 |
| 6,712,525 | B1 * | 3/2004 | Kawase et al. | 385/76 |
| 6,744,956 | B2 * | 6/2004 | Sun et al. | 385/114 |
| 6,758,600 | B2 | 7/2004 | Del Grosso et al. | 385/71 |
| 6,763,166 | B2 * | 7/2004 | Yow et al. | 385/114 |
| 6,775,458 | B2 * | 8/2004 | Yow et al. | 385/137 |
| 6,795,632 | B1 | 9/2004 | Knapp et al. | 385/135 |
| 6,832,032 | B2 * | 12/2004 | Simmons et al. | 385/121 |
| 6,839,475 | B2 * | 1/2005 | Kawase et al. | 385/14 |
| 6,847,774 | B2 * | 1/2005 | Simmons et al. | 385/134 |
| 6,850,684 | B2 * | 2/2005 | Simmons et al. | 385/134 |
| 6,869,227 | B2 | 3/2005 | Del Grosso et al. | 385/71 |
| 6,873,772 | B2 * | 3/2005 | Nakaya | 385/114 |
| 6,885,800 | B2 * | 4/2005 | Sun et al. | 385/114 |
| 7,147,383 | B2 * | 12/2006 | Sullivan | 385/59 |
| 7,184,635 | B2 * | 2/2007 | Livingston | 385/114 |
| 7,237,966 | B2 * | 7/2007 | Quinby et al. | 385/78 |
| 7,391,952 | B1 | 6/2008 | Ugolini et al. | 385/135 |
| 7,416,347 | B2 * | 8/2008 | Livingston et al. | 385/53 |
| 2001/0007603 | A1 | 7/2001 | Sakurai et al. | 385/60 |
| 2002/0039468 | A1 | 4/2002 | Lin | 385/17 |
| 2003/0017741 | A1 | 1/2003 | Olson et al. | 439/483 |
| 2003/0072535 | A1 | 4/2003 | Sun et al. | 385/59 |
| 2003/0174953 | A1 | 9/2003 | Carnevale et al. | 385/39 |
| 2003/0236020 | A1 | 12/2003 | Iamartino et al. | 439/445 |
| 2004/0052472 | A1 | 3/2004 | Roth et al. | 385/56 |
| 2004/0126069 | A1 | 7/2004 | Jong et al. | 385/109 |
| 2004/0228634 | A1 | 11/2004 | Fricker | 398/135 |
| 2005/0084216 | A1 | 4/2005 | Yang et al. | 385/71 |
| 2005/0084221 | A1 | 4/2005 | Yang et al. | 385/114 |
| 2005/0207709 | A1 | 9/2005 | Del Grosso et al. | 385/71 |
| 2006/0088258 | A1 | 4/2006 | Sasaki et al. | 385/114 |

FOREIGN PATENT DOCUMENTS

| | | |
|---|---|---|
| EP | 1172673 | 1/2002 |
| EP | 1237026 | 9/2002 |
| WO | WO02/044782 | 6/2002 |
| WO | WO03/016975 | 2/2003 |

OTHER PUBLICATIONS

Ott, et al., "Twelve channel optical fiber connector assembly: from commercial off the shelf to space flight use," Jul. 1998, 13 pages.

Takaya, et al., "Design and Performance of a Multifiber Backpanel Type Connector," IEEE Photonics Technology Letters, vol. 8, No. 5, May 1996, 3 pages.

* cited by examiner

OPTICAL FIBER INTERCONNECTION DEVICES AND SYSTEMS USING SAME

RELATED APPLICATIONS

This application claims the benefit of priority under 35 U.S.C. § 119(e) of U.S. Parent Provisional Application Ser. No. 61/010,807 filed on U.S. Parent Provisional Application Filing Date of Jan. 11, 2008, which application is incorporated by reference herein.

FIELD OF THE INVENTION

The present invention relates to optical fiber interconnection devices configured to interconnect multi-fiber, optical fiber connectors and, in one exemplary embodiment, to interconnect two 12-fiber connectors, or multiples thereof, with three 8-fiber connectors, or multiples thereof.

BACKGROUND OF THE INVENTION

Conventional optical fiber cables comprise optical fibers that conduct light used to transmit voice, video, and data information. An optical ribbon includes a group of optical fibers that are coated with a ribbon common layer, which common layer may be of the ultraviolet (UV) light curable type. Typically, such a ribbon common layer is extruded about a group of individually colored optical fibers that have been arranged in a planar array, and is then irradiated with a UV light source that cures the ribbon common layer. The cured ribbon common layer protects the optical fibers and generally aligns the respective positions of optical fibers in the planar array. Optical fiber ribbons can be connected to multi-fiber connectors, for example, MTP connectors. MTP connectors can be used in local-area network (LAN) applications, for example, data centers and parallel optics interconnects between servers.

Conventional networking solutions, which utilize a 12-fiber MTP connector assembly for example, are often configured in a point to point system. Fiber polarity (i.e., the transmit and receive functions of a given fiber) is addressed by flipping fibers in one end of the assembly just before entering the MTP connector in an epoxy plug, or by providing "A" and "B" type break-out modules where the fiber is flipped in the "B" module and straight in the "A" module. Optical polarity modules that provide fiber optic interconnection solutions for MTP connectors in a network environment are discussed in U.S. Pat. Nos. 6,758,600 and 6,869,227, which patents are assigned to the present Assignee and which patents are incorporated by reference herein.

In a traditional network environment that includes a data center, floor space (e.g. the 24"×24" raised floor tile within a data center) comes at a very expensive premium. Further, the vertical space (identified as a 1.75" rack space) within the floor space also comes at a premium. Therefore, each time passive and active fiber-optic equipment completely fills this space, new space is required for the system to grow. In addition, the space being used is already crammed with a high-density of components.

Consequently, it is difficult to effectively manage the cabling in data centers for such networks. This is particularly true for Storage Area Networks (SANs) that utilize SAN directors having high-density input/output ("I/O") interfaces called "line cards." Line cards hold multiple optical transceivers that convert optical signals to electrical signals and vice versa. The line cards have connector ports into which network cabling is plugged. The number of ports per line card can vary, e.g., 16, 32 and 48 port line cards are available. Complicating matters is the use of line cards with non-matching port counts (e.g., port counts not having even increments of 12-fibers) so that some fibers in the ribbon cable assembly end up not connected to a connector port. For example, it is sometimes desirable to use line cards with 16 and 32 port counts, but these are not directly suitable for use with 12-fiber-based cabling systems. What is needed is a universal conversion module that efficiently converts two 12-fiber connector configurations (or multiples thereof) to three 8-fiber connector configurations (or multiples thereof) in a manner that takes into account the polarity of the fibers.

SUMMARY OF THE INVENTION

A first aspect of the invention is an optical fiber interconnection device. The optical fiber interconnection device includes optical fiber connector arrays and optical fibers optically interconnecting at least some of the optical fiber connectors. The interconnection device comprises at least first and second optical fiber connector arrays respectively comprising at least six ports each with arrays of optical fibers extending therefrom. In addition, the interconnection device comprises at least first, second and third optical fiber connector arrays respectively having at least four ports each. The first at least four-port optical fiber connector array receiving at least two optical fibers from the first at least six-port optical fiber connector array, and the second at least four-port connector array receiving at least two optical fibers from the first at least six-port optical fiber connector array and receiving at least two optical fibers from the second at least six-port optical fiber connector array, and the third at least four-port optical fiber connector array receiving at least two optical fibers from the second at least six-port optical fiber connector array. The first and second at least six-port optical fiber connector arrays respectively can include more connector ports, for example, at least twelve ports each. The first, second, and third at least four-port optical fiber connector arrays can include more connector ports, for example, at least eight ports each. In addition, not all ports need be used. For example, one of the at least eight-port connector arrays can include unused connectors, and at least one of the twelve-port connector arrays can include unused connectors.

In an exemplary aspect, the interconnection device can be in the form of a module. The module includes first and second twelve-port connectors respectively having ports $1P_{12}(1)$ through $1P_{12}(12)$ and ports $2P_{12}(1)$ through $2P_{12}(12)$. The module also includes first, second and third eight-port connectors respectively having ports $1P_8(1)$ through $1P_8(8)$, ports $2P_8(1)$ through $2P_8(8)$, and ports $3P_8(1)$ through $3P_8(8)$. An array of optical fibers called a "harness" is configured to connect the ports as follows (where $\{a1, b1 \ldots\} \leftrightarrow \{a2, b2 \ldots\}$ denotes connecting a1 to a2, b1 to b2, etc):

i) $\{1P_8(1), 1P_8(3), 1P_8(5), 1P_8(7)\} \leftrightarrow \{1P_{12}(1), 1P_{12}(2), 1P_{12}(3), 1P_{12}(4)\}$;

ii) $\{1P_8(2), 1P_8(4), 1P_8(6), 1P_8(8)\} \leftrightarrow \{1P_{12}(12), 1P_{12}(11), 1P_{12}(10), 1P_{12}(9)\}$;

iii) $\{2P_8(1), 2P_8(3), 2P_8(5), 2P_8(7)\} \leftrightarrow \{1P_{12}(5), 1P_{12}(6), 2P_{12}(1), 2P_{12}(2)\}$;

iv) $\{2P_8(2), 2P_8(4), 2P_8(6), 2P_8(8)\} \leftrightarrow \{P_{12}(8), 1P_{12}(7), 2P_{12}(12), 2P_{12}(11)\}$;

v) $\{3_8(1), 3P_8(3), 3P_8(5), 3P_8(7)\} \leftrightarrow \{2P_{12}(3), 2P_{12}(4), 2P_{12}(5), 2P_{12}(6)\}$; and vi) $\{3_8(2), 3P_8(4), 3P_8(6), 3P_8(8)\} \leftrightarrow \{2P_{12}(10), 2P_{12}(9), 2P_{12}(8), 2P_{12}(7)\}$.

A second aspect of the invention is a method of optically interconnecting first and second twelve-port connectors having respective ports $1P_{12}(1)$ through $1P_{12}(12)$ and ports $2P_{12}(1)$ through $2P_{12}(12)$ to first, second and third eight-port connectors having respective ports $1P_8(1)$ through $1P_8(8)$, ports $2P_8(1)$ through $2P_8(8)$, and ports $3P_8(1)$ through $3P_8(8)$, the method comprising configuring an array of optical fibers to connect the ports as follows (where {a1, b1 ... } ↔ {a2, b2 ... } denotes a1 to a2; b1 to b2; etc):

i) $\{1P_8(1), 1P_8(3), 1P_8(5), 1P_8(7)\} \leftrightarrow \{1P_{12}(1), 1P_{12}(2), 1P_{12}(3), 1P_{12}(4)\}$;

ii) $\{1P_8(2), 1P_8(4), 1P_8(6), 1P_8(8)\} \leftrightarrow \{1P_{12}(12), 1P_{12}(11), 1P_{12}(10), 1P_{12}(9)\}$;

iii) $\{2P_8(1), 2P_8(3), 2P_8(5), 2P_8(7)\} \leftrightarrow \{1P_{12}(5), 1P_{12}(6), 2P_{12}(1), 2P_{12}(2)\}$;

iv) $\{2P_8(2), 2P_8(4), 2P_8(6), 2P_8(8)\} \leftrightarrow \{1P_{12}(8), 1P_{12}(7), 2P_{12}(12), 2P_{12}(11)\}$;

v) $\{3P_8(1), 3P_8(3), 3P_8(5), 3P_8(7)\} \leftrightarrow \{2P_{12}(3), 2P_{12}(4), 2P_{12}(5), 2P_{12}(6)\}$; and vi) $\{3P_8(2), 3P_8(4), 3P_8(6), 3P_8(8)\} \leftrightarrow \{2P_{12}(10), 2P_{12}(9), 2P_{12}(8), 2P_{12}(7)\}$.

A third aspect of the invention is an optical fiber interconnection module. The module includes an enclosure defining an interior region. At least one set of first and second twelve-port connectors are operably connected to the enclosure and respectively have ports $1P_{12}(1)$ through $1P_{12}(12)$ and ports $2P_{12}(1)$ through $2P_{12}(12)$. At least one set of first, second and third eight-port connectors are operably connected to the enclosure and respectively have ports $1P_8(1)$ through $1P_8(8)$, ports $2P_8(1)$ through $2P_8(8)$, and ports $3P_8(1)$ through $3P_8(8)$. At least one set of twelve first optical fibers having a color-code are contained within the interior region and are optically connected to ports $1P_{12}(1)$ through $1P_{12}(12)$. Likewise, at least one set of twelve second optical fibers having the color code are contained within the interior region and are optically connected to ports $2P_{12}(1)$ through $2P_{12}(12)$. The at least one first and second sets of color-coded optical fibers are configured to connect the ports as follows (where {a1, b1 ... } ↔ {a2, b2 ... } denotes connecting a1 to a2, b1 to b2, etc):

i) $\{1P_8(1), 1P_8(3), 1P_8(5), 1P_8(7)\} \leftrightarrow \{1P_{12}(1), 1P_{12}(2), 1P_{12}(3), 1P_{12}(4)\}$;

ii) $\{1P_8(2), 1P_8(4), 1P_8(6), 1P_8(8)\} \leftrightarrow \{1P_{12}(12), 1P_{12}(11), 1P_{12}(10), 1P_{12}(9)\}$;

iii) $\{2P_8(1), 2P_8(3), 2P_8(5), 2P_8(7)\} \leftrightarrow \{1P_{12}(5), 1P_{12}(6), 2P_{12}(1), 2P_{12}(2)\}$;

iv) $\{2P_8(2), 2P_8(4), 2P_8(6), 2P_8(8)\} \leftrightarrow \{1P_{12}(8), 1P_{12}(7), 2P_{12}(12), 2P_{12}(11)\}$;

v) $\{3P_8(1), 3P_8(3), 3P_8(5), 3P_8(7)\} \leftrightarrow \{2P_{12}(3), 2P_{12}(4), 2P_{12}(5), 2P_{12}(6)\}$; and vi) $\{3P_8(2), 3P_8(4), 3P_8(6), 3P_8(8)\} \leftrightarrow \{2P_{12}(10), 2P_{12}(9), 2P_{12}(8), 2P_{12}(7)\}$.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate the various exemplary embodiments of the invention, and together with the description serve to explain the principals and operations of the invention.

DETAILED DESCRIPTION OF THE INVENTION

Reference is now made in detail to the present preferred embodiments of the invention, examples of which are illustrated in the accompanying drawings. Whenever possible, like or similar reference numerals are used throughout the drawings to refer to like or similar parts. It should be understood that the embodiments disclosed herein are merely examples, each incorporating certain benefits of the present invention. Various modifications and alterations may be made to the following examples within the scope of the present invention, and aspects of the different examples may be mixed in different ways to achieve yet further examples. Accordingly, the true scope of the invention is to be understood from the entirety of the present disclosure, in view of but not limited to the embodiments described herein.

The present invention is directed to a conversion device configured to convert or otherwise interconnect two connectors (or n multiples thereof) each having twelve fibers (and thus twelve ports and referred to as "12f" connectors) to three connectors (or n multiples thereof) each having an eight fibers (and thus eight ports and referred to as "8f" connectors). In the discussion below and in the claims, the notation {a1, b1, c1 ... } ↔ {a2, b2, c2 ... } denotes connecting a1 to a2, b1 to b2, c1 to c2, etc. The conversion device works with either universal routing or classic routing. It also works with n multiples of this configuration (n=1, 2, 3, ... ), i.e., for n sets of two 12f connectors and n sets of three 8f connectors.

Figure 1:
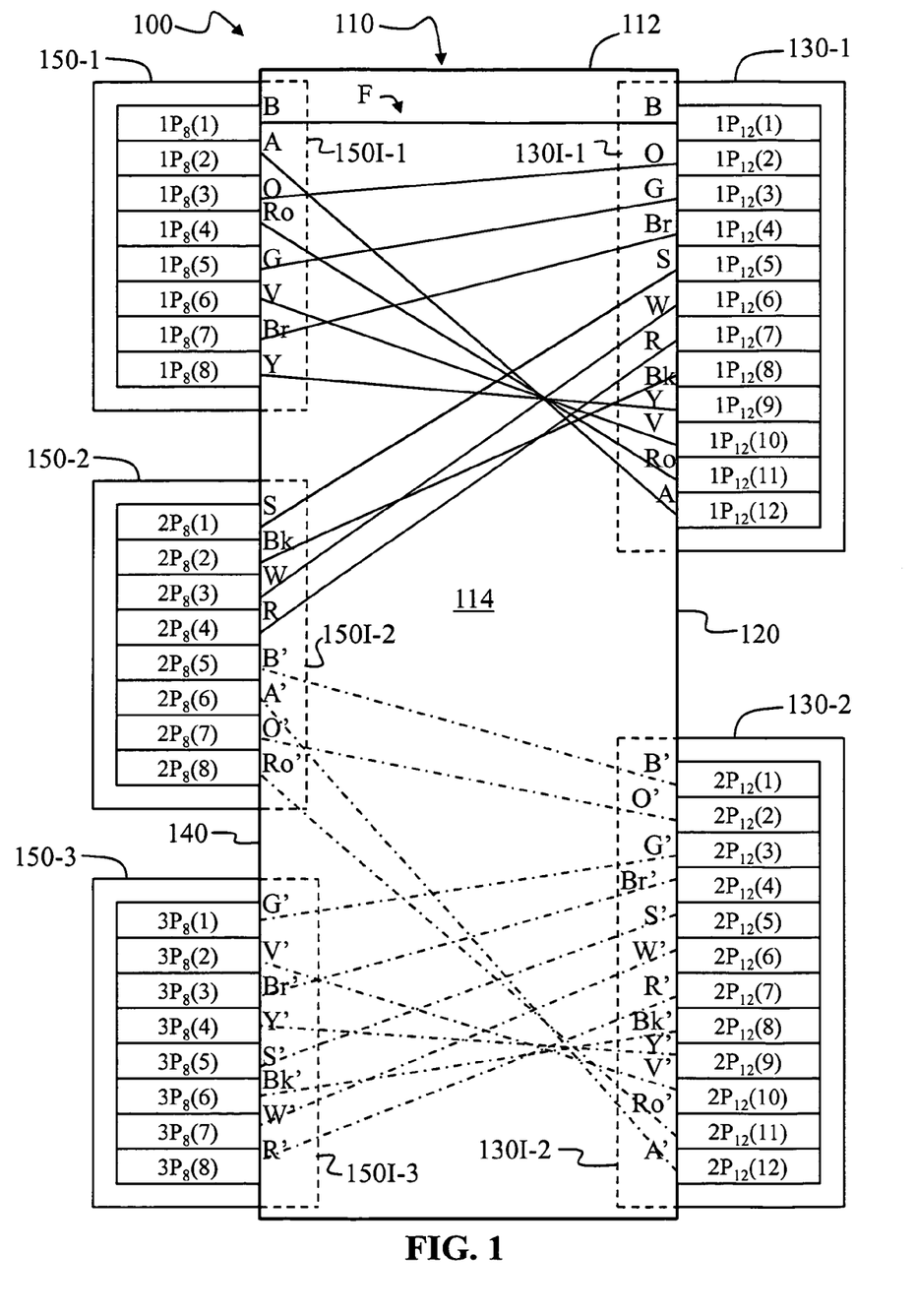
FIG. 1 is a schematic diagram of an example embodiment of an optical fiber interconnection device according to the present invention illustrating a modular form of the device, wherein optical fiber ("harness") wiring connects two 12-fiber connectors with three 8-fiber connectors in a configuration that maintains fiber polarization.

FIG. 1 is a schematic diagram of an example embodiment of an example optical fiber interconnection device 100 according to the present invention. Interconnecting device 100 will include arrays of optical fiber connectors, and can take the form of an individually formed enclosure with one or more walls in module form, a flexible substrate with optical fibers associated therewith, and an optical fiber harness or bundles of arrayed optical fibers and connectors, and on the other hand, the interconnection unit 100 can include combinations of the foregoing. The term "harness" means a collection of optical fibers, including being bound in groups or sub-groups as by a wrapping, adhesive, tying elements, or other suitable collecting fixtures or devices, or the harness may comprise optical fibers that are unbound, for example, loose optical fibers without tying elements. Most preferably, the optical fibers are arranged in the form of optical fiber ribbons, and the optical fiber ribbons are collected together by one or more tying elements. In exemplary embodiments, the 12f and 8f connectors are referred to below as either "twelve-fiber" or "twelve-port" connectors, or "eight-fiber" or "eight-port" connectors, respectively.

The example interconnection device 100 of FIG. 1 includes an interconnection unit 110 in the form of a module and that provides the device with a modular function. In an example embodiment, interconnection unit 110 is formed by at least one wall 112 that defines an interior cavity 114 for receiving and supporting optical fibers and connectors as discussed below. In example embodiments discussed in greater detail below, interconnection unit 110 includes a single "wall" 112 in the form of a cylindrical jacketed cable. In another example embodiment, interconnection unit 110 is a polygonal- (e.g., rectangular-) cross-section jacketed cable. In other example embodiments disclosed below, device 100 does not include a module or enclosure and associated wall or box structure.

In the example embodiment shown in FIG. 1, interconnection unit 110 has a number of walls 112 that form a rectangular-cross-section enclosure. Interconnection unit 110 includes a side 120 that includes two 12f connectors 130 (namely 130-1 and 130-2) and an opposite side 140 that includes three 8f connectors 150 (namely, 150-1, 150-2 and 150-3). In an example embodiment, 8f connectors 150 and 12f connectors 130 are or include MTP-type or MTO-type connectors. In an example embodiment, connectors 130 and 150 are 12-port connectors, wherein for the 8f connectors 150 only 8 of the 12 ports are used.

The 12f connectors 130 each have ports $P_{12}(i)$, where the subscript "12" denotes the total number of ports and i=1, 2, 3 ... 12, and indicates the $i^{th}$ port. Connector ports for 12f connector 130-1 are denoted $1P_{12}(i)$ while connector ports for 12f connector 130-2 are denoted $2P_{12}(i)$. Likewise, the 8f connectors 150 each have ports $P_8(j)$, where the subscript "8" denotes the total number of (active) ports and j=1, 2, 3 ... 8, and indicates the $j^{th}$ port. Connector ports for 8f connector 150-1 are denoted $1P_8(j)$ while connector ports for 8f connector 150-2 are denoted $2P_8(j)$. The connector ports $P_{12}$ of 12f connectors 130 are optically connected to select connector ports $P_8$ of 8f connectors 150 using an array of optical fiber sections F called a "harness" with the fiber sections F called the "harness fibers."

Harness fibers F are "wired" according to a color-coding scheme, e.g., the standard color-coding scheme used in telecommunications systems wherein B=blue, O=orange, G=Green, Br=Brown, S=Slate, W=White, R=Red, Bk=Black, Y=Yellow, V=Violet, Ro=Rose, and A=Aqua. Harness fibers F associated with connector 130-1 are shown as solid lines while the harness fibers associated with connector 130-2 are shown as dashed-dotted lines for ease of illustration. Also, the color codes associated with 12f connector 130-2 use primes (e.g., B', O', etc.) to distinguish from the colored fibers associated with 12f connector 130-1. The select harness wiring configuration between the ports $P_{12}$ of 12f connectors 130-1, 130-2 and ports $P_8$ of 8f connectors 150-1, 150-2, and 150-3 to establish the optical interconnection therebetween are discussed in detail below. The harness fibers can be arranged as such and may optionally be attached to a substrate, for example, a flexible substrate.

Note that in an example embodiment, harnesses fibers F are connected to connectors 130 and 150 via corresponding connectors 130I and 150I internal to interconnection unit 110. These are shown in phantom lines in FIG. 1 for the ease of illustration. In an example embodiment, connectors 130, 150, 130I and 150I are MTP connectors.

In an example embodiment, 12f connectors 130 and 8f connectors 150 are preferably epoxy and polish compatible multi-fiber connectors, for example, part of Corning Cable Systems' LANScape® connector solution set. The epoxy and polish connector is a 12f connector achieving very high density in a small space, it contains multiple optical paths, the optical paths being arranged in a generally planar array. The optical paths being immediately adjacent to at least one other optical path for optical alignment with the optical fibers in an optical fiber ribbon. The MTP connector is designed for multi-mode or single-mode applications, and uses a push/pull design for easy mating and removal. The MTP connector can be the same size as a conventional SC connector, but provides twelve times the fiber density, advantageously saving cost and space. The MTP connector includes a key for proper orientation for registration with any required optical adapters. An optical connector adapter (not shown) can be disposed between the connector outside the module and a connector inside the module. However, other connection schemes can be used. Preferably, a in an example embodiment, a ribbon fan-out kit is used to manage the optical fibers from between the connector inside the module and the connector stations.

Wiring Configuration

With continuing reference to FIG. 1, two sets of twelve harness fibers F denoted by the above-mentioned colors (and differentiated by unprimed and primed notation) interconnect select ports $1P_{12}(i)$ and $2P_{12}(i)$ to select ports $1P_8(j)$, $2P_8(j)$ and $3P_8(j)$ as shown. The port interconnections are summarized in the following Tables 1 through 3, where m=1 or 2 and is used to denote 12f connector 130-1 or 130-2 (i.e., connector 130-m and ports $mP_{12}(i)$).

TABLE 1

Wiring @ Connector 150-1

| Port $1P_8(j)$ | Port $1P_{12}(i)$ | Color |
|---|---|---|
| $1P_8(1)$ | $1P_{12}(1)$ | B |
| $1P_8(2)$ | $1P_{12}(12)$ | A |
| $1P_8(3)$ | $1P_{12}(2)$ | O |
| $1P_8(4)$ | $1P_{12}(11)$ | Ro |
| $1P_8(5)$ | $1P_{12}(3)$ | G |
| $1P_8(6)$ | $1P_{12}(10)$ | V |
| $1P_8(7)$ | $1P_{12}(4)$ | Br |
| $1P_8(8)$ | $1P_{12}(9)$ | Y |

TABLE 2

Wiring @ Connector 150-2

| Port $2P_8(j)$ | Port $mP_{12}(i)$ | Color |
|---|---|---|
| $2P_8(1)$ | $1P_{12}(5)$ | S |
| $2P_8(2)$ | $1P_{12}(8)$ | Bk |
| $2P_8(3)$ | $1P_{12}(6)$ | W |
| $2P_8(4)$ | $1P_{12}(7)$ | R |
| $2P_8(5)$ | $2P_{12}(1)$ | B' |
| $2P_8(6)$ | $2P_{12}(12)$ | A' |
| $2P_8(7)$ | $2P_{12}(2)$ | O' |
| $2P_8(8)$ | $2P_{12}(11)$ | Ro' |

TABLE 3

Wiring @ Connector 150-3

| Port $3P_8(j)$ | Port $2P_{12}(i)$ | Color |
|---|---|---|
| $3P_8(1)$ | $2P_{12}(3)$ | G' |
| $3P_8(2)$ | $2P_{12}(10)$ | V' |

TABLE 3-continued

| Wiring @ Connector 150-3 | | |
|---|---|---|
| Port $3P_8(j)$ | Port $2P_{12}(i)$ | Color |
| $3P_8(3)$ | $2P_{12}(4)$ | Br' |
| $3P_8(4)$ | $2P_{12}(9)$ | Y' |
| $3P_8(5)$ | $2P_{12}(5)$ | S' |
| $3P_8(6)$ | $2P_{12}(8)$ | Bk' |
| $3P_8(7)$ | $2P_{12}(6)$ | W' |
| $3P_8(8)$ | $2P_{12}(7)$ | R' |

The interconnections between ports $P_{12}$ and $P_8$ of connectors 130 and 150 can be described as follows:

For connector $1P_8(j)$: The odd ports ODD$\{1P_8(j)\}=1P_8(1)$, $1P_8(3)$, $1P_8(5)$ and $1P_8(7)$ are connected to respective ports $1P_{12}(1)$, $1P_{12}(2)$, $1P_{12}(3)$ and $1P_{12}(4)$, while the even ports EVEN$\{2 P_8(j)\}=1P_8(2)$, $1P_8(4)$, $1P_8(6)$ and $1P_8(8)$ are connected to respective ports $1P_{12}(12)$, $1P_{12}(11)$, $1P_{12}(10)$ and $1P_{12}(9)$.

For connector $2P_8(8)$: The odd ports ODD$\{1P_8(j)\}=2P_8(1)$, $2P_8(3)$, $2P_8(5)$ and $2P_8(7)$ are connected to respective ports $1P_{12}(5)$, $1P_{12}(6)$, $2P_{12}(1)$ and $2P_{12}(2)$, while the even ports EVEN$\{2P_8(j)\}=2P_8(2)$, $2P_8(4)$, $2P_8(6)$ and $2P_8(8)$ are connected to respective ports $1P_{12}(8)$, $1P_{12}(7)$, $2P_{12}(12)$ and $2P_{12}(11)$.

For connector $3P_8(8)$: The odd ports ODD$\{1P_8(j)\}=3P_8(1)$, $3P_8(3)$, $3P_8(5)$ and $3P_8(7)$ are connected to respective ports $2P_{12}(3)$, $2P_{12}(4)$, $2P_{12}(5)$ and $2P_{12}(6)$, while the even ports EVEN$\{3P_8(j)\}=3P_8(2)$, $3P_8(4)$, $3P_8(6)$ and $3P_8(8)$ are connected to respective ports $2P_{12}(10)$, $2P_{12}(9)$, $2P_{12}(8)$ and $2P_{12}(7)$.

The above connections can be written in more compact form as:

i) $\{1P_8(1), 1P_8(3), 1P_8(5), 1P_8(7)\} \leftrightarrow \{1P_{12}(1), 1P_{12}(2), 1P_{12}(3), 1P_{12}(4)\}$;

ii) $\{1P_8(2), 1P_8(4), 1P_8(6), 1P_8(8)\} \leftrightarrow \{1P_{12}(12), 1P_{12}(11), 1P_{12}(10), 1P_{12}(9)\}$;

iii) $\{2P_8(1), 2P_8(3), 2P_8(5), 2P_8(7)\} \leftrightarrow \{1P_{12}(5), 1P_{12}(6), 2P_{12}(1), 2P_{12}(2)\}$;

iv) $\{2P_8(2), 2P_8(4), 2P_8(6), 2P_8(8)\} \leftrightarrow \{1P_{12}(8), 1P_{12}(7), 2P_{12}(12), 2P_{12}(11)\}$;

v) $\{3P_8(1), 3P_8(3), 3P_8(5), 3P_8(7)\} \leftrightarrow \{2P_{12}(3), 2P_{12}(4), 2P_{12}(5), 2P_{12}(6)\}$; and vi) $\{3P_8(2), 3P_8(4), 3P_8(6), 3P_8(8)\} \leftrightarrow \{2P_{12}(10), 2P_{12}(9), 2P_{12}(8), 2P_{12}(7)\}$.

The mapping of harness fibers F between ports $P_{12}$ and $P_8$ of respective connectors 130 and 150 can also be described in terms of the aforementioned color-coding scheme where $1P_{12}(i)$ and $2P_{12}(i)$ (for i=1 through 12) corresponds to the set $S_{12}$ of colored fibers for each of connectors 130-1 and 130-2, namely $1S_{12}=\{B, O, G, Br, S, W, R, Bk, Y, V, Ro, A\}$ and $2S_{12}=\{B', O', G', Br', S', W', R', Bk', Y', V', Ro', A'\}$. The corresponding sets $S_8$ for ports $1P_8(j)$ and $2P_8(j)$ and $3P_8(j)$ (for j=1 through 8) of respective connectors 150-1, 150-2 and 150-3 are as follows: $1S_8=\{B,A,O,Ro,G,V,Br,Y\}$; $2S_8=\{S, Bk, W, R, B', A', O', Ro'\}$, and $3S_8=\{G', V', Br', Y', S', Bk', W', R'\}$. Thus, interconnection device 100 can be said to "map" the colored fiber sets $1S_{12}$ and $2S_{12}$ associated with ports $1P_{12}$ and $2P_{12}$ of 12f connectors 130-1 and 130-2 to the colored fiber sets $1S_8$, $2S_8$ and $3S_8$ associated with ports $1P_8$, $2P_8$ and $3P_8$ of 8f connectors 150-1, 150-2 and 150-3.

Device 100 of the present invention also preserves polarity between connectors 130-1, 130-2 and 150-1, 150-2 and 150-3. Thus, if connectors 130-1 and 130-2 each have a polarity configuration for ports $P_{12}(i)$ of POL$_{12}(j)=\{T, R, T, R, T, R, T, R, T, R, T, R\}$, where T=transmit and R=receive, then the connectors 150-1, 150-2 and 150-3 each have a polarization configuration for ports $P_8(j)$ of POL$_8(j)=\{T, R, R, T, T, R, R, T\}$. Thus, each connector 130 and 150 has the same number of transmit T ports as receive R ports. Device 100 of the present invention thus provides polarization-preserving parallel optics solutions for performing the interconnection $\{(2n)\times 12f\} \leftrightarrow \{(3n)\times 8f\}$.

Figure 2A:
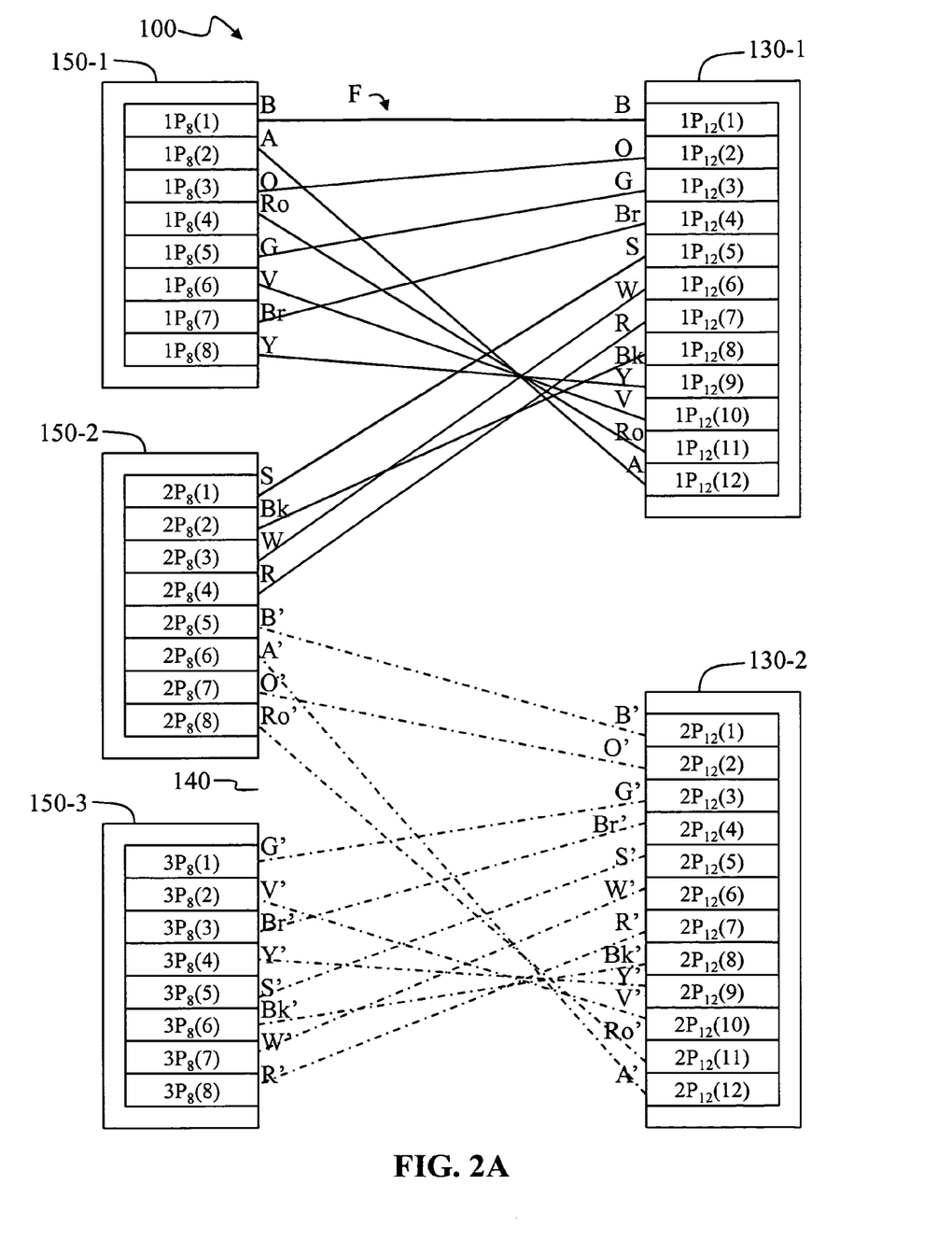
FIG. 2A is a schematic diagram of an example embodiment of the optical fiber interconnection device of the present invention that does not include an enclosure.

The present invention does not require a module or enclosure and associated wall or box structure. For example, FIG. 2A illustrates an example embodiment of interconnection device 100 is in the form of the optical fiber harness F and connectors 130 and 150. In this case, the harness, or the harness and the connectors can be attached or supported with an optional substrate, for example, a flexible substrate made of thermoplastic.

Figure 2B:
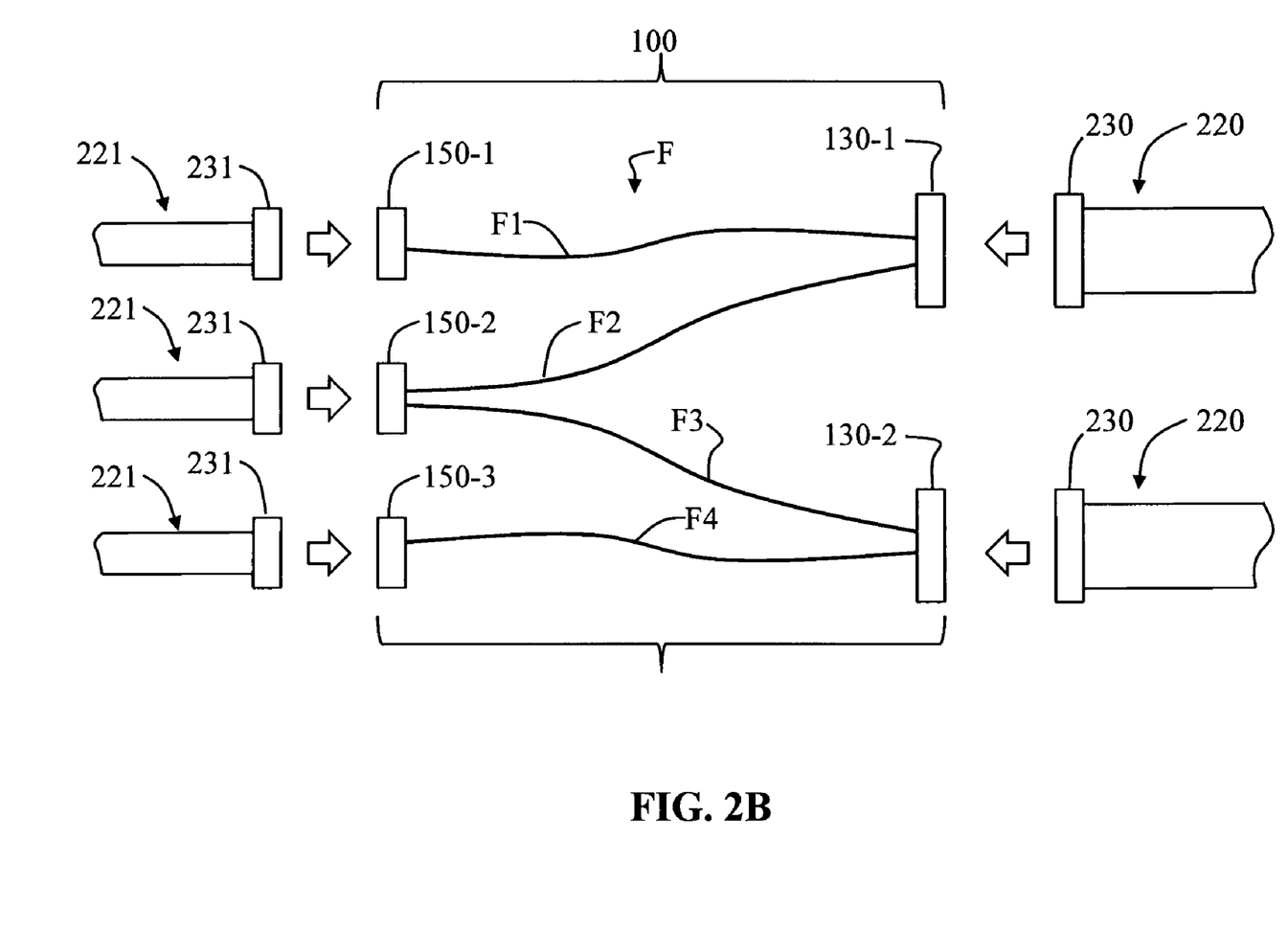
FIG. 2B is a schematic diagram illustrating the device of FIG. 2A as used to connect to external devices in the form of 8-fiber and 12-fiber optical fiber cables.

FIG. 2B shows how interconnection device 100 of FIG. 2A connects to devices in the form of 12-f trunk cables 220 each having the exemplary 12-f connector 230 and 8-f trunk cables 221 each having an 8-f connector 231. Harness fibers F are shown as divided into four groupings or cablings F1 through F4, where F1=$\{B, A, O, Ro, G, V, Br, Y\}$, F2=$\{S, Bk, W, R\}$, F3=$\{B', A', O', Ro'\}$, and F4=$\{G', V', Br', Y', S', Bk', W', R'\}$.

Optical Interconnection System

Figure 3:
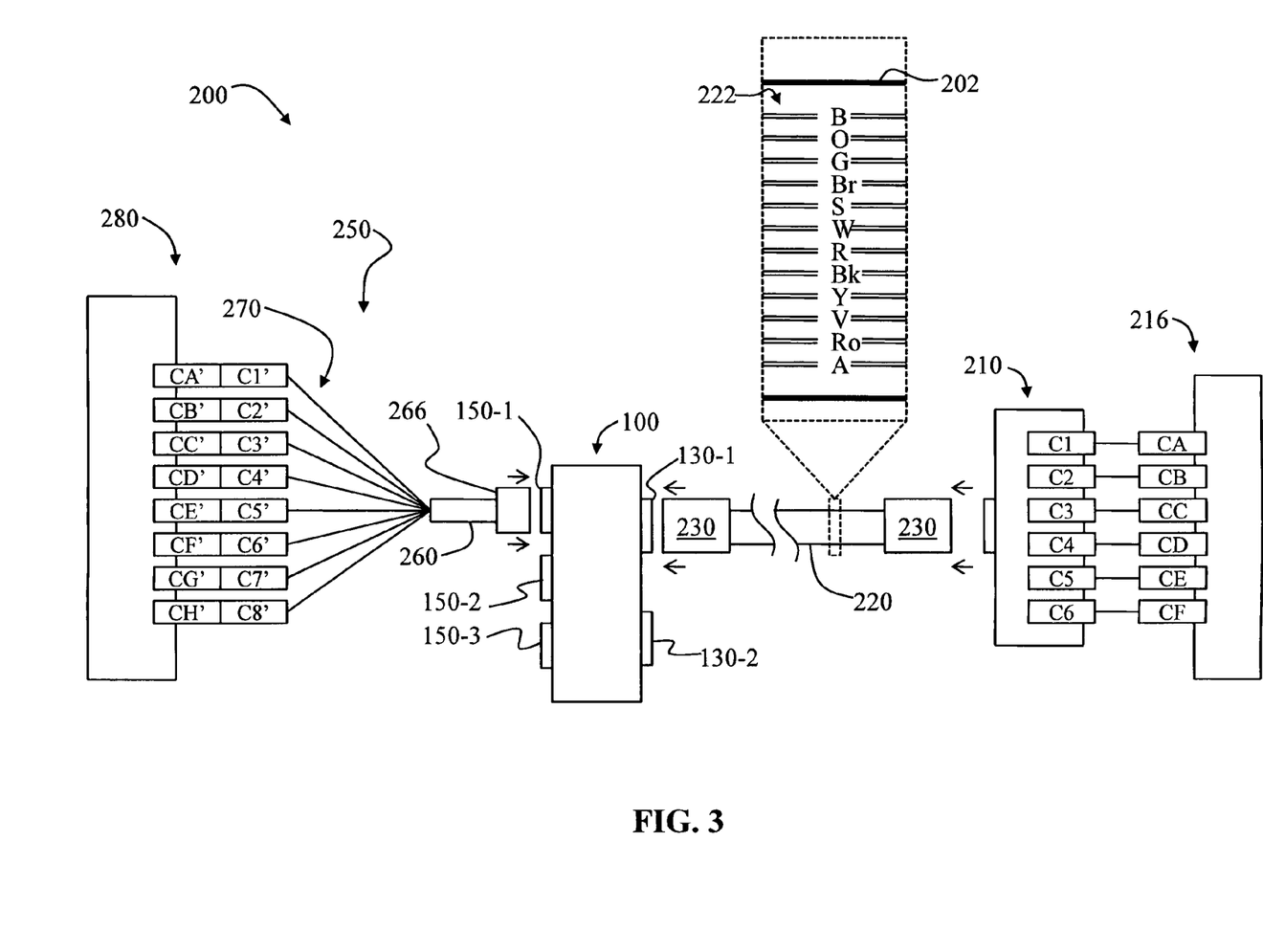
FIG. 3 is a schematic diagram of an optical interconnection system that utilizes the optical fiber interconnection device of the present invention.

FIG. 3 is a schematic diagram of an optical interconnection system 200 that utilizes the optical fiber interconnection device 100 of the present invention. System 200 may be used, for example, as part of an optical network, such as a LAN or a SAN at an optical telecommunications data center.

System 200 includes a first optical fiber interconnection module 210 shown in more detail in FIG. 4 and discussed in greater detail below. The first interconnection module 210 is of the type discussed in the aforementioned U.S. Pat. Nos. 6,869,227 and 6,758,600. First interconnection module 210 is optically connected to an optical fiber cable 220 that carries optical fibers 222 referred to herein as "cable fibers." Optical fiber cable 220 as used in the present embodiment is also called a "universal trunk" and in an example embodiment is a ribbon array cable terminated at both ends with one or more connectors 230. In an example embodiment, connectors 230 are MTP connectors. In one example embodiment, cable 220 has 72 fibers 222 and six MTP connectors 230 at each end, while in another example embodiment, the cable has 12 fibers and a single MTP connector at each end. Other arrangements with suitable multiples of connectors are also envisioned. The inset in FIG. 3 shows an example embodiment of a twelve-fiber trunk cable 220 along with example color designations for cable fibers 222. Trunk cable 220 includes a single connector 230 at each of its ends.

Trunk cable 220 is connected to device 100 via trunk cable connector 230 mating with one of the module connectors 130-1 or 130-2. System 200 includes a fiber harness 250 having an optical fiber cable 260 that includes at one end an 8-f connector 266 and at the other end eight separate single-fiber connectors C1' through C8' respectively connected to a the eight fiber optical fibers 270 carried in cable 260. The eight fibers 270 in cable 260 are connected via connector 266 device 100 at connector 150-1 and thus correspond to ports $1P_8(1)$ through $1P_8(8)$ having associated therewith the respective colors $\{B, A, O, Ro, G, V, Br, Y\}$.

Figure 4:
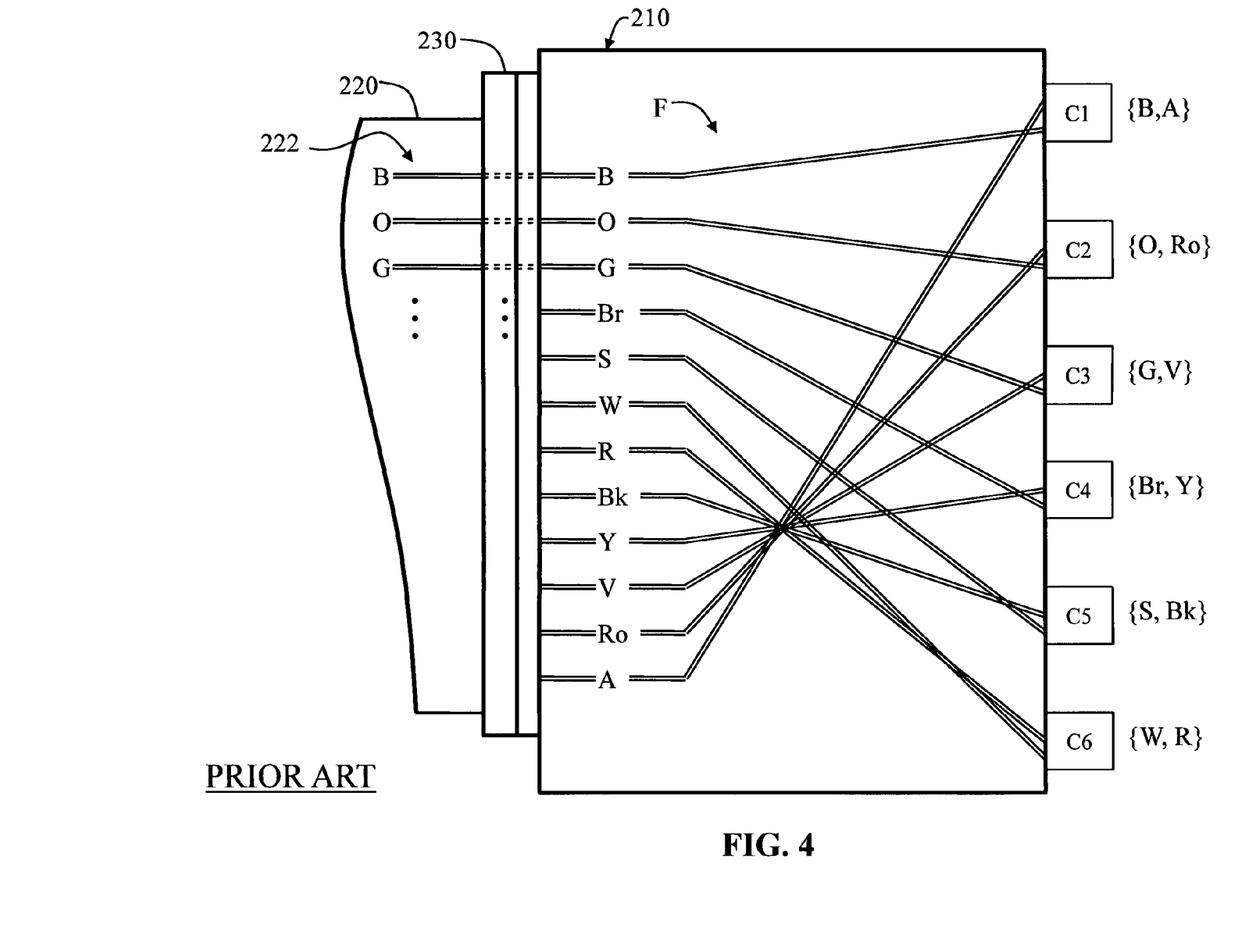
FIG. 4 is a close-up detailed schematic diagram of a prior art first optical fiber interconnection module used the system of FIG. 3 and that connects six dual-fiber ports to respective fibers in a 12-fiber optical fiber "trunk" cable.

With reference to FIG. 4, first interconnection module 210 includes a number of harness fibers F having a different configuration than that of device 100. In an example embodiment, connectors C1 through C6 each have two ports associated with two harness fibers F and have a respective color configuration of $\{B, A\}$, $\{O, Ro\}$, $\{G, V\}$, $\{Br, Y\}$, $\{S, Bk\}$ and {W, R}. First interconnect module 210 serves to interconnect connectors C1 through C6 to the corresponding (i.e., same-colored) fibers 222 in trunk cable 220. Connectors C1 through C6 may be, for example, connectors that connect to a six-port electronics device 216 (e.g., a line card) having dual-fiber connectors CA through CF (e.g., on a patch panel or adapter panel), where each connector C1-C6 is connected to two fibers, one for transmitting (T) and one for receiving (R). Likewise, connectors C1' through C8' at the other end of system 200 may be, for example, connectors that connect to an eight-port electronics device 280 having single-fiber connectors CA' through CH' (e.g., on a patch panel or adapter panel) with each connector being connected to a single fiber 270. Connectors C1 through C6 and connectors C1' through C8' typically provide connections to electronic devices such as line cards, servers, storage devices, etc.

Note that in the example embodiment, the color configuration at ports $1P_8(j)$ of {B, A, O, Ro, G, V, Br, Y} is similar to first four fiber color pairings at connectors C1-C6, namely: {B,A}, {O, Ro}, {G, V}, {Br, Y}. Note also that for a polarity of {T, R}, {T, R} ... {T, R} for connectors C1-C6, the polarity at connectors C1'-C8' has the sequence {T}, {R}, {T}, {R} ... {T}, {R}—i.e., the polarity between the ends of system 200 is preserved.

Modules 100 of the present inventions, and systems 200 that utilize one or more modules 100 are thus suitable for use for optically interconnecting assemblies in a network, for example, a LAN or a SAN. Multiple spans of assemblies can also be interconnected. Fiber flips in the trunk assembly just prior to one end of the MTP connector, for polarity correction, is not necessary, resulting in a complexity/cost reduction.

Figure 5:
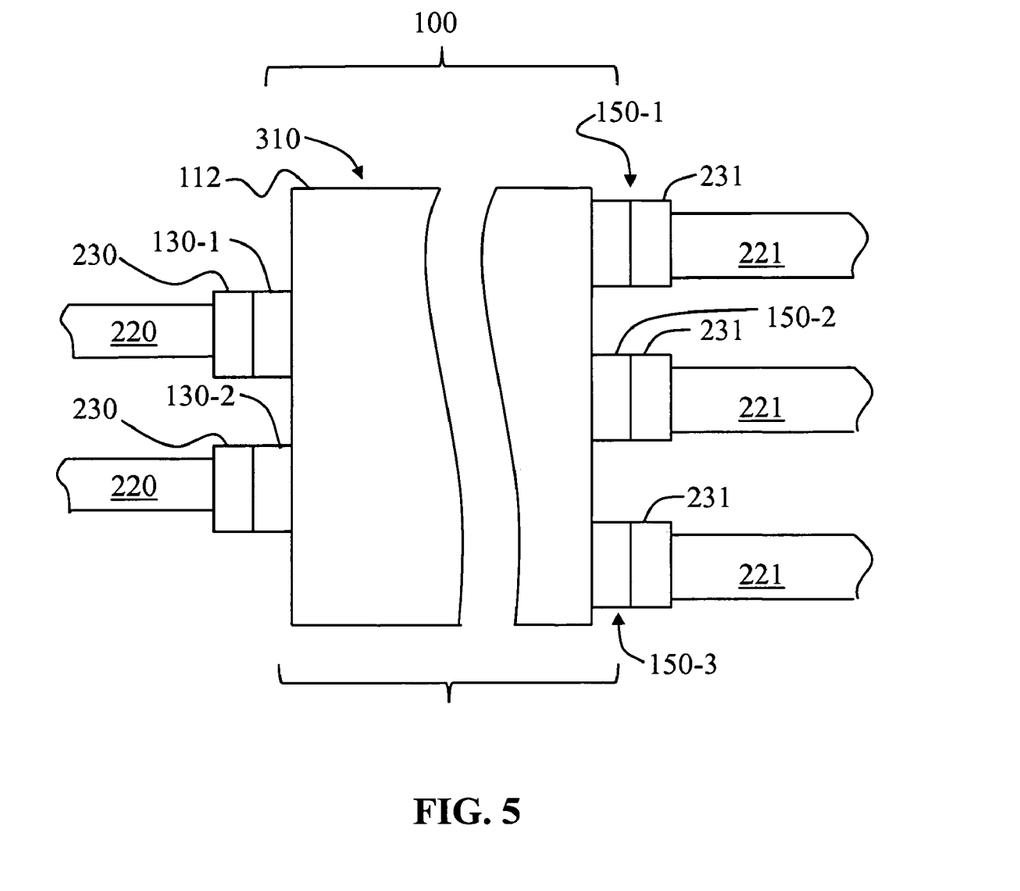
FIG. 5 is a schematic diagram of an example embodiment of the device of the present invention that includes an enclosure comprising a jacketed cable.

FIG. 5 illustrates an example embodiment of interconnection device 100 wherein interconnection unit 110 is in the form of or is otherwise defined by a jacketed cable 310 that contains harness fibers F. In an example embodiment, the at least one wall 112 of interconnection unit 110 can be a single wall formed by circular-cross-section jacketed cable 310. This allows device 100 to be used more like a cable, such as a jumper cable, as opposed to a rectangular, box-like module that could easily slide into an electronics shelf, connector housing, or like structure. In other example embodiments, jacketed cable 310 has a polygonal (e.g., rectangular) cross-section.

Figure 6:
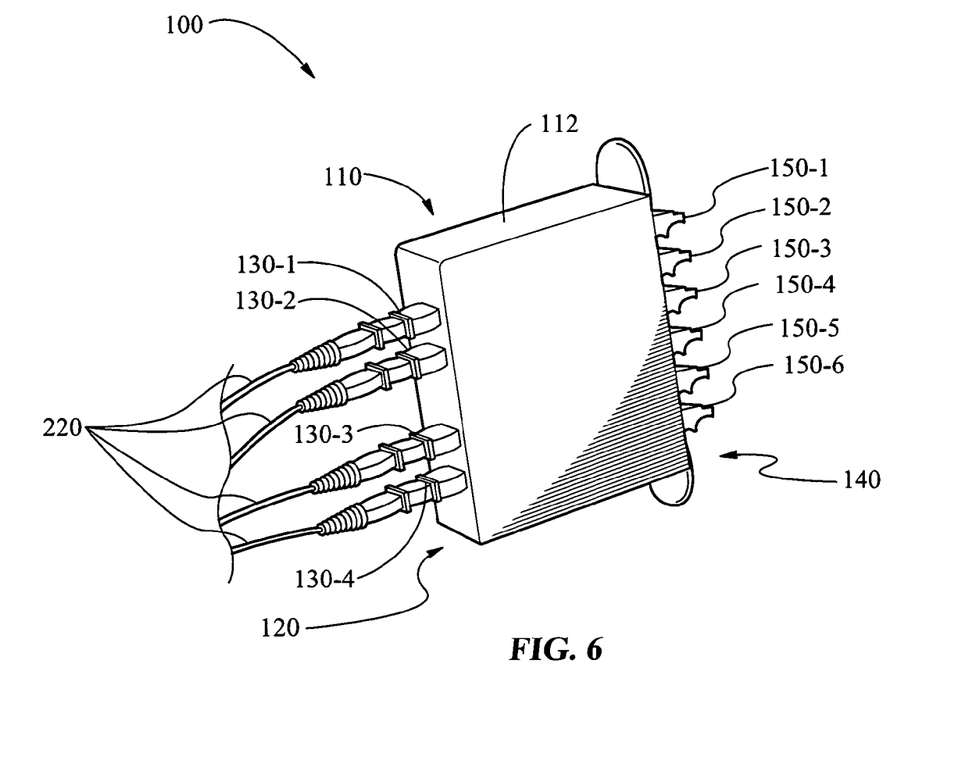
FIG. 6 is a perspective view of an example embodiment of the optical fiber interconnection device in the modular form of FIG. 1 having an enclosure and four 12-fiber connectors on one side of the enclosure and six 8-fiber connectors on the opposite side of the enclosure.

FIG. 6 is a perspective view of an example embodiment of device 100 that is configured to handle four 12f optical fiber cables 220 as shown at respective four 12f connectors 130-1, 130-2, 130-3 and 130-4 at side 120. Note that there are now six 8f connectors 150-1 through 150-6 on side 140. Device 100 of FIG. 5 accommodates a total of 48 fibers, i.e., has (4×12=) 48 total ports $P_{12}(i)$ and (6×8=) 48 total ports $P_8(j)$. In device 100 of FIG. 6, the number (i.e., the multiple) of sets of connectors is n=2.

As discussed above, in an example embodiment, connectors 130 and 150 can all be 12f connectors, with connectors 130 have dummy fibers placed in the unused ports $P_8(j)$—for example, the two ports at either end of the connector, i.e., $P_8(1)$, $P_8(2)$ and $P_8(11)$ and $P_8(12)$. The embodiment of device 100 of FIG. 6 has a rectangular cross-section enclosure 100 that allows the module to be easily installed into an electronics shelf, connector housing, or like structure.

As set out above, the optical fiber interconnection device 100 includes optical fiber connector arrays, and n multiples thereof, for example, 150-1, 150-2, 150-3, 130-1, and 130-2, and optical fibers optically interconnecting at least some of the optical fiber connectors. More specifically, optical fiber connector arrays 130-1 and 130-2 respectively can include at least six ports each with arrays of optical fibers respectively extending therefrom. In addition, the first, second and third optical fiber connector arrays 150-1, 150-2, and 150-3 can respectively have at least four ports each. In an exemplary embodiment, connector array 150-1 receives at least two optical fibers from the first at least six-port optical fiber connector array 130-1, and the second at least four-port connector array 150-2 receives at least two optical fibers from the first at least six-port optical fiber connector array 130-1 and receives at least two optical fibers from the second at least six-port optical fiber connector array 130-2, and the third at least four-port optical fiber connector array 150-3 receiving at least two optical fibers from the second at least six-port optical fiber connector array 130-2. The first and second at least six-port optical fiber connector arrays 130-1 and 130-2 respectively can include more connector ports, for example, at least twelve ports each as shown in FIGS. 1 and 2A and described herein. The first, second, and third at least four-port optical fiber connector arrays 150-1, 150-2, and 150-3 can include more connector ports, for example, at least eight ports each as shown in FIGS. 1 and 2A as described herein. In addition, not all ports need be used. For example, one of the connector arrays 130 and 150 can include unused connectors.

The present invention has been described with reference to the foregoing embodiments, which embodiments are intended to be illustrative of the present inventive concepts rather than limiting. Persons of ordinary skill in the art will appreciate that variations and modifications of the foregoing embodiments may be made without departing from the scope of the appended claims.

What is claimed is:

1. An optical fiber interconnection device, comprising:
   first and second twelve-port connectors respectively having ports $1P_{12}(1)$ through $1P_{12}(12)$ and ports $2P_{12}(1)$ through $2P_{12}(12)$;
   first, second and third eight-port connectors respectively having ports $1P_8(1)$ through $1P_8(8)$, ports $2P_8(1)$ through $2P_8(8)$, and ports $3P_8(1)$ through $3P_8(8)$; and
   an array of optical fibers configured to connect the ports as follows (where {a1, b1 ... } ↔ {a2, b2 ... } denotes connecting a1 to a2, b1 to b2, etc):
   i) {$1P_8(1)$, $1P_8(3)$, $1P_8(5)$, $1P_8(7)$} ↔ {$1P_{12}(1)$, $1P_{12}(2)$, $1P_{12}(3)$, $1P_{12}(4)$};
   ii) {$1P_8(2)$, $1P_8(4)$, $1P_8(6)$, $1P_8(8)$} ↔ {$1P_{12}(12)$, $1P_{12}(11)$, $1P_{12}(10)$, $1P_{12}(9)$};
   iii) {$2P_8(1)$, $2P_8(3)$, $2P_8(5)$, $2P_8(7)$} ↔ {$1P_{12}(5)$, $1P_{12}(6)$, $2P_{12}(1)$, $2P_{12}(2)$};
   iv) {$2P_8(2)$, $2P_8(4)$, $2P_8(6)$, $2P_8(8)$} ↔ {$1P_{12}(8)$, $1P_{12}(7)$, $2P_{12}(12)$, $2P_{12}(11)$};
   v) {$3P_8(1)$, $3P_8(3)$, $3P_8(5)$, $3P_8(7)$} ↔ {$2P_{12}(3)$, $2P_{12}(4)$, $2P_{12}(5)$, $2P_{12}(6)$}; and
   vi) {$3P_8(2)$, $3P_8(4)$, $3P_8(6)$, $3P_8(8)$} ↔ {$2P_{12}(10)$, $2P_{12}(9)$, $2P_{12}(8)$, $2P_{12}(7)$}.

2. The optical fiber interconnection device of claim 1, wherein at least one of the eight-port connectors are twelve-port connectors, and wherein four of the twelve ports in said at least one eight-port connector are not used.

3. The optical fiber interconnection device of claim 1, wherein the optical fibers include first and second sets of twelve color-coded fibers.

4. The optical fiber interconnection device of claim 1, wherein for n integer and n≧2, the device includes n sets of the two twelve-port connectors and n sets of the three eight-port connectors.

5. The optical fiber interconnection device of claim 1, wherein the device includes:

an enclosure that defines an interior region and that contains the array of optical fibers, and wherein the eight-port connectors and twelve-port connectors are connected to the enclosure.

6. The optical fiber interconnection device of claim 5, wherein the enclosure comprises a fiber cable jacket.

7. An optical fiber interconnection system, comprising:
the optical fiber interconnection device of claim 1; and
at least one twelve-fiber optical fiber cable connected to the device at one of the twelve-port connectors.

8. The optical fiber interconnection system of claim 7, wherein the twelve-fiber optical fiber cable includes color-coded optical fibers and further including:
six two-fiber connectors; and
an optical fiber interconnection module configured to optically interconnect the six two-fiber connectors to the optical fibers in the at least one twelve-fiber cable on a color-coded basis.

9. The optical fiber interconnection device of claim 8, further including:
at least one eight-fiber optical fiber cable connected to the module at one of the eight-port connectors.

10. The optical fiber interconnection system of claim 9, wherein the at least one eight-fiber optical fiber cable includes color-coded optical fibers and further including:
eight single-fiber connectors optically connected to the optical fibers in the at least one eight-fiber cable on a color-coded basis.

11. A method of optically interconnecting first and second twelve-port connectors having respective ports $1P_{12}(1)$ through $1P_{12}(12)$ and ports $2P_{12}(1)$ through $2P_{12}(12)$ to first, second and third eight-port connectors having respective ports $1P_8(1)$ through $1P_8(8)$, ports $2P_8(1)$ through $2P_8(8)$, and ports $3P_8(1)$ through $3P_8(8)$, the method comprising:
configuring an array of optical fibers to connect the ports as follows (where $\{a1, b1 \ldots\} \leftrightarrow \{a2, b2 \ldots\}$ denotes a1 to a2; b1 to b2; etc):
i) $\{1P_8(1), 1P_8(3), 1P_8(5), 1P_8(7)\} \leftrightarrow \{1P_{12}(1), 1P_{12}(2), 1P_{12}(3), 1P_{12}(4)\}$;
ii) $\{1P_8(2), 1P_8(4), 1P_8(6), 1P_8(8)\} \leftrightarrow \{1P_{12}(12), 1P_{12}(11), 1P_{12}(10), 1P_{12}(9)\}$;
iii) $\{2P_8(1), 2P_8(3), 2P_8(5), 2P_8(7)\} \leftrightarrow \{1P_{12}(5), 1P_{12}(6), 2P_{12}(1), 2P_{12}(2)\}$;
iv) $\{2P_8(2), 2P_8(4), 2P_8(6), 2P_8(8)\} \leftrightarrow \{1P_{12}(8), 1P_{12}(7), 2P_{12}(12), 2P_{12}(11)\}$;
v) $\{3P_8(1), 3P_8(3), 3P_8(5), 3P_8(7)\} \leftrightarrow \{2P_{12}(3), 2P_{12}(4), 2P_{12}(5), 2P_{12}(6)\}$; and
vi) $\{3P_8(2), 3P_8(4), 3P_8(6), 3P_8(8)\} \leftrightarrow \{2P_{12}(10), 2P_{12}(9), 2P_{12}(8), 2P_{12}(7)\}$.

12. The method of claim 11, further including enclosing the array of optical fibers in an enclosure.

13. The method of claim 12, further including arranging the twelve-port and eight-port connectors on opposite sides of the enclosure.

14. The method of claim 12, further including:
connecting at least one twelve-fiber optical fiber cable to at least one of the twelve-port connectors; and
connecting at least one eight-fiber optical fiber cable to at least one of the eight-port connectors.

15. The method of claim 14, further including:
connecting eight single-fiber connectors to the at least one eight-fiber optical fiber on a color-coded basis; and
connecting six two-fiber connectors to the at least one twelve-fiber optical fiber on a color-coded basis.

16. The method of claim 11, including for n integer and $n \geq 2$, providing n sets of the two twelve-port connectors and n sets of the three eight-port connectors so as to repeat said port configuration n times.

17. An optical fiber interconnection module comprising:
an enclosure defining an interior region;
at least one set of first and second twelve-port connectors operably connected to the enclosure and respectively having ports $1P_{12}(1)$ through $1P_{12}(12)$ and ports $2P_{12}(1)$ through $2P_{12}(12)$;
at least one set of first, second and third eight-port connectors operably connected to the enclosure and respectively having ports $1P_8(1)$ through $1P_8(8)$, ports $2P_8(1)$ through $2P_8(8)$, and ports $3P_8(1)$ through $3P_8(8)$;
at least one set of twelve first optical fibers having a color-code and contained within the interior region and optically connected to ports $1P_{12}(1)$ through $1P_{12}(12)$;
at least one set of twelve second optical fibers having said color code and contained within the interior region and optically connected to ports $2P_{12}(1)$ through $2P_{12}(12)$; and
wherein the at least one sets of first and second color-coded optical fibers are configured to connect the ports as follows (where $\{a1, b1 \ldots\} \leftrightarrow \{a2, b2 \ldots\}$ denotes connecting a1 to a2, b1 to b2, etc):
i) $\{1P_8(1), 1P_8(3), 1P_8(5), 1P_8(7)\} \leftrightarrow \{1P_{12}(1), 1P_{12}(2), 1P_{12}(3), 1P_{12}(4)\}$;
ii) $\{1P_8(2), 1P_8(4), 1P_8(6), 1P_8(8)\} \leftrightarrow \{1P_{12}(12), 1P_{12}(11), 1P_{12}(10), 1P_{12}(9)\}$;
iii) $\{2P_8(1), 2P_8(3), 2P_8(5), 2P_8(7)\} \leftrightarrow \{1P_{12}(5), 1P_{12}(6), 2P_{12}(1), 2P_{12}(2)\}$;
iv) $\{2P_8(2), 2P_8(4), 2P_8(6), 2P_8(8)\} \leftrightarrow \{1P_{12}(8), 1P_{12}(7), 2P_{12}(12), 2P_{12}(11)\}$;
v) $\{3P_8(1), 3P_8(3), 3P_8(5), 3P_8(7)\} \leftrightarrow \{2P_{12}(3), 2P_{12}(4), 2P_{12}(5), 2P_{12}(6)\}$; and
vi) $\{3P_8(2), 3P_8(4), 3P_8(6), 3P_8(8)\} \leftrightarrow \{2P_{12}(10), 2P_{12}(9), 2P_{12}(8), 2P_{12}(7)\}$.

18. An optical fiber interconnection system comprising:
the optical fiber interconnection module of claim 17;
at least one twelve-fiber optical fiber cable having said color code and connected to at least one of the twelve-fiber connectors; and
at least one eight-fiber optical fiber cable having said color code and connected to at least one of the eight-fiber connectors.

19. The system of claim 18, further comprising:
an electronics device having six dual-fiber connectors that correspond to said color code; and
an optical fiber interconnection module configured to optically interconnect the six dual-fiber connectors to corresponding single optical fibers in the at least one twelve-fiber cable based on said color code.

20. The system of claim 19, further including:
eight single-fiber connectors respectively connected to corresponding single fibers in the at least one eight-fiber optical fiber cable based on said color code.

21. An optical fiber interconnection device, comprising:
first and second twelve-port optical fiber connectors respectively having ports $1P_{12}(1)$ through $1P_{12}(12)$ and ports $2P_{12}(1)$ through $2P_{12}(12)$;
first, second and third eight-port optical fiber connectors respectively having ports 1P8(1) through 1P8(8), ports 2P8(1) through 2P8(8), and ports 3P8(1) through 3P8(8); and
an array of optical fibers configured to connect the ports as follows (where $\{a1, b1 \ldots\} \leftrightarrow \{a2, b2 \ldots\}$ denotes connecting a1 to a2, b1 to b2, etc):

i) $\{1P_8(1), 1P_8(3), 1P_8(5), 1P_8(7)\} \leftrightarrow \{1P_{12}(1), 1P_{12}(2), 1P_{12}(3), 1P_{12}(4)\}$;

ii) $\{1P_8(2), 1P_8(4), 1P_8(6), 1P_8(8)\} \leftrightarrow \{1P_{12}(12), 1P_{12}(11), 1P_{12}(10), 1P_{12}(9)\}$;

iii) $\{2P_8(1), 2P_8(3), 2P_8(5), 2P_8(7)\} \leftrightarrow \{1P_{12}(5), 1P_{12}(6), 2P_{12}(1), 2P_{12}(2)\}$;

iv) $\{2P_8(2), 2P_8(4), 2P_8(6), 2P_8(8)\} \leftrightarrow \{1P_{12}(8), 1P_{12}(7), 2P_{12}(12), 2P_{12}(11)\}$;

v) $\{3P_8(1), 3P_8(3), 3P_8(5), 3P_8(7)\} \leftrightarrow \{2P_{12}(3), 2P_{12}(4), 2P_{12}(5), 2P_{12}(6)\}$; and vi) $\{3P_8(2), 3P_8(4), 3P_8(6), 3P_8(8)\} \leftrightarrow \{2P_{12}(10), 2P_{12}(9), 2P_{12}(8), 2P_{12}(7)\}$;

wherein the device includes:

an enclosure that defines an interior region and that at least partially receives the array of optical fibers, and wherein the eight-port connectors and twelve-port connectors are connected to the enclosure.

22. The optical fiber interconnection device of claim 21, wherein at least one of the eight-port connectors are twelve-port connectors, and wherein four of the twelve ports in said at least one eight-port connector are not used.

23. The optical fiber interconnection device of claim 21, wherein the optical fibers include first and second sets of twelve color-coded fibers.

24. The optical fiber interconnection device of claim 21, wherein for n integer and n≧2, the device includes n sets of the two twelve-port connectors and n sets of the three eight-port connectors.

25. The optical fiber interconnection device of claim 21, wherein said optical fibers are arranged as an optical fiber harness.

26. The optical fiber interconnection device of claim 21, wherein said optical fibers are associated with a substrate.

27. An optical fiber interconnection device with optical fiber connector arrays and optical fibers optically interconnecting at least some of the optical fiber connectors, comprising:

(a) at least first and second optical fiber connector arrays respectively comprising at least six ports each, a first array of optical fibers extending from the first optical fiber connector array, and a second optical fiber array extending from the second optical fiber connector array;

(b) at least first, second and third optical fiber connector arrays respectively having at least four ports each;

(c) said first at least four-port optical fiber connector array receiving optical fibers only from the first at least six-port optical fiber connector array;

(d) said second at least four-port connector array receiving at least two optical fibers from the first at least six-port optical fiber connector array;

(e) said second at least four-port connector array receiving at least two optical fibers from the second at least six-port optical fiber connector array; and (f) said third at least four-port optical fiber connector array receiving at least two optical fibers from the second at least six-port optical fiber connector array.

28. The optical fiber interconnection device of claim 27, wherein said first and second at least six-port optical fiber connector arrays respectively include at least twelve ports.

29. The optical fiber interconnection device of claim 28, wherein said first, second, and third at least four-port optical fiber connector arrays respectively include at least eight ports.

30. The optical fiber interconnection device of claim 29, wherein at least one of said eight-port connector arrays includes unused connectors.

31. The optical fiber interconnection device of claim 29, wherein at least one of said twelve-port connector arrays includes unused connectors.

32. The optical fiber interconnection device of claim 27, wherein said third at least four-port optical fiber connector array receives optical fibers from only the second at least six-port optical fiber connector array.

* * * * *